United States Patent Office 2,960,423
Patented Nov. 15, 1960

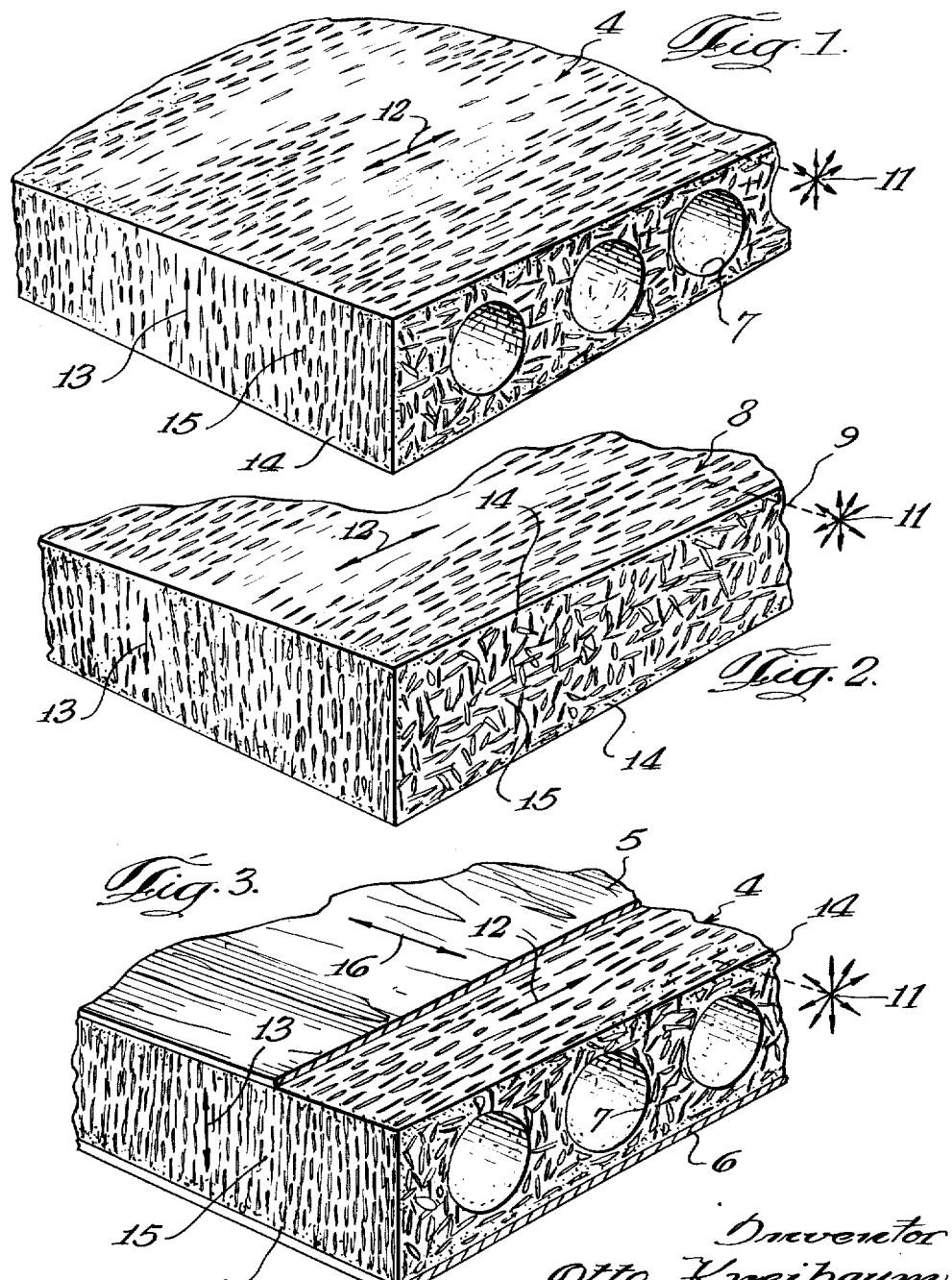

2,960,423

WOOD CHIP BOARD

Otto Kreibaum, Muhlenstrasse 193, Lauenstein,
Hannover, Germany

Filed Dec. 29, 1954, Ser. No. 478,365

14 Claims. (Cl. 154—45.9)

This invention relates generally to boards made of wood chips or splinters bonded together by means of a suitable thermosetting glue or adhesive, such as a synthetic resin, and more particularly to such boards having the wood chips oriented therein in a special manner. For so much of the subject matter claimed herein as a continuation-in-part which is also disclosed in my copending application Serial No. 197,093, filed November 22, 1950 and issued as U.S. Patent No. 2,854,696, I claim the priority of that application.

Prior boards having similar constituents, and particularly those made by the well-known "badge" process, in which the size and shape of the board are determined by the size and shape of the mould employed and the pressure is applied in the direction of the thickness of the board, are not sufficiently stable, having too much tendency to warp in response to variations in moisture content of the ambient air.

The primary object of this invention, therefore, is to provide boards of the type described which do not have this disadvantage, but have satisfactory stability against warping.

As is well understood in the art, varying the moisture content of wood causes it to expand and contract mainly transversely to the direction of its fibers. In a natural board in which the fibers extend longitudinally thereof, and in a chip board made by the badge process in which substantially all of the chips will be disposed with their fiber lengths parallel to opposite faces of the board, such expansion or contraction will cause warping because the resultant forces will be in the directions of the width and thickness, or thickness, respectively, of such boards.

The primary object of this invention is achieved, however, by orienting the chips in the board so that the major axes of most of them are disposed substantially at right angles to the longitudinal axis of the board. The chips are predominantly disposed in the present board with their lengths in the direction of their fibers extending substantially transversely of the board, i.e., in directions of the thickness or width of the board or intermediate directions. Consequently, satisfactory stability and non-warping is attained because the forces caused by expansion or contraction of the fibers of the individual chips substantially compensate for each other in the directions of the width and thickness of the board and the resultant forces are in the direction of the length of the board.

It will thus be appreciated that the chip board of the present invention is well adapted for use as a core to the surfaces of which wood veneer, or other finishing panels or materials, may readily be adhered or otherwise suitably applied, resulting in a final product of substantial strength and extreme stability against warping.

A further important object of this invention is to provide a chip board which is cheap and easy to manufacture, and in addition to the primary characteristic of stability against warpage as above described, to provide a chip board superior to prior chip boards in such properties as greater screw holding capacity and resistance against attempted removal of finish panels or cover sheets of veneer, or the like. These advantageous characteristics result from the described orientation of the chips, whereby most of them have their ends, rather than their sides, directed toward the side faces and edges of the board. Such orientation of the chips results in most of them being anchored into the board with their fiber lengths angularly disposed relative to the side faces of the board, as compared to chip boards made with the "badge" process where in the fibers if the chips are predominantly disposed lengthwise parallel to the side faces of the board. With the latter arrangement of the chips in a badge process board, even if a very strong bonding of a finish panel of veneer thereto is effected, physical separation of the veneer may be more readily accomplished because the chips at the surface of the board may be relatively easily spilt lengthwise in the direction of their fibers.

Thus another object of the invention is attained, which is to provide a chip board having the properties of stability, surface quality, dimensional accuracy, uniformity of density, and strength requisite to use as a core.

Another important object of the invention is the provision of a chip board, having the desired orientation of the chips described, in which none or practically none of the chips are plasticized or compressed beyond their elastic limit, so that the board retains normal wood characteristics. This result is attained, as well as insuring the desired chip orientation, by incrementally forming the board in the direction of its length in relatively thin successive strata extending transversely of the board.

Such continuous extrusion of the board achieves a further important object of the invention, which is to provide chip boards of substantial width, selected thickness and any desired length.

Another object is the provision of tubular chip boards, or ones having passages or bores spaced from each other and extending longitudinally therethrough. And this object also is readily attained by virtue of such extrusion process.

A further important object of the invention is to provide a chip board, with the chips oriented as described, having identical smooth finish surfaces on both sides. This is accomplished by providing a board made up of chips of various sizes wherein most of the smaller chips are disposed in longitudinally extending outside layers separated from each other by a central layer comprising most of the larger chips. Such arrangement of the chips will be referred to as "zoning," and may be attained by intermittently gravity feeding equal quantities of a substantially dry and homogeneous mixture of the various sized chips and thermo-setting binding agent down inclined passages along opposite sides of the compression chamber of a vertical press.

The accomplishment of the above object by effecting the desired "zoning" of the chips also obviates an additional disadvantage of chip boards made by the "badge" process. In the latter, the finer chips will tend to sift through the coarser ones toward the bottom of the mould, before the pressure is applied, so that the bottom side of the resulting board will be more dense and less porous than the top side. Moisture therefore may more readily penetrate the upper surfaces of such boards than their lower surfaces, with the result that they are subject to serious warpage due to different expansions or contractions at their opposite sides. On the other hand, the above-described zoning of the chips in the board of the present invention provides opposite side portions and surfaces of substantially identical density and porosity, thus eliminating this additional type of warping which is common with badge process chip boards.

Expressed somewhat differently, the zoning, or desired disposition of the differently sized splintery wood particles into similar outside layers comprising most of the finer particles separated by a central layer made up primarily of the larger particles, is effected by gravity feeding equal quantities of the chip and adhesive mixture along opposite sides of the compression chamber of a vertical press before the application of any compressive forces thereto by the press. Each half of the resulting board, as defined by a side face and a theoretical plane passing longitudinally through the center of the board parallel to the side faces, therefore will have the same physical characteristics, as will the side faces, so that warpage due to opposite side portions with different characteristics is prevented.

Numerous other objects and advantages of the invention will be apparent as it is better understood from the following description, which, when taken in connection with the accompanying drawings, discloses a preferred embodiment thereof.

In the drawings:

Figure 1 is a perspective view of a portion of a chip board embodying the features of the present invention and incorporating spaced passages or bores extending longitudinally therethrough;

Fig. 2 is a view similar to Fig. 1 of a solid chip board; and

Fig. 3 is a view similar to Figs. 1 and 2 showing a portion of the tubular board of Fig. 1 with finish panels of wood veneer adhered thereto.

Referring more particularly to the drawings, reference numeral 4 indicates in general a chip board incorporating the features of the invention, which is shown in Fig. 3 employed as a core between finish panels 5 and 6, illustrated in the form of sheets of wood veener adhered to the opposite side surfaces of the core, with the grain of the veneer running substantially in the direction of arrow 16 longitudinally of the core to provide the greatest added strength in the direction of the resultant forces induced in the core by moisture content changes. The chip board illustrated at 4 is of the so-called tubular type, being provided with spaced passages or bores 7 extending longitudinally therethrough, which are formed in the board in a manner to be described later in detail. A solid board, indicated generally by reference numeral 8, is illustrated in Fig. 2 which, except for the bores 7, is identical to the tubular board 4.

These boards 4 and 8 are made up of chips from desired types of splintery wood and of various sizes ranging from fine material, such as wood meal, to coarser chips, with most of them having their maximum dimension less than the thickness of the board and all bonded together by a thermo-setting glue or adhesive. Naturally air-dried wood which has reached moisture equilibrium, whether hard wood, soft wood, stumps, forest waste, or other available splintery wood, is preferrred as the raw material from which the chips are obtained for obvious economic reasons.

Since the forming of the chips is merely ancillary to the presently claimed product, as is the preferred method and apparatus for producing it, they will only be described briefly herein without specific illustration. For preliminary reduction of the raw material, a standard rotary chipper may be used. Since the raw material customarily is introduced into such apparatus with its grain or fiber length at substantially right angles to the cutting knives, it is cut thereby nearly perpendicular to the direction of the fibers, and the length of the cut portions may readily be limited to any desired maximum. Subsequent treatment of these portions in a strandard percussion or grinding mill employing suitable sieves to regulate accurately the maximum dimensions of the resulting raw ships produces chips of various sizes ranging from such maximum dimensions to finest splintery material. Since the cut portions introduced to such mill are most readily broken down in the directions of their fibers, the maximum dimension or length of most of the final chips will be in the direction of their fibers.

These final or raw chips are then dried, preferably by means or hot gases, until their moisture content is from four to six percent by weight, although the latter range may be varied considerably. The dried chips thereafter are mixed with a relatively small amount of binding agent, which is one of the obvious reasons why the claimed product is extremely economical. Any suitable thermo-setting glue or adhesive may be employed, as the primary binding agent, such as synthetic resin, preferably of the urea-formaldehyde type. Other examples are phenolic and melamine glues, but in spite of their better water resistant characteristics, they are not preferred because of their cost and objectionable odor. The binding agent in liquid form is mixed throughly with the dried chips, and in addition to the selected glue, includes water and a suitable extender, and may also include a suitable catalyst, either acid or caustic. As will be appreciated by anyone skilled in the art, the particular catalyst employed, if any, results in quicker binding, and lowering of the setting temperature required. A lower temperature therefore may be employed in forming a board, as hereinafter described, when a catalyst is used since only sufficient temperature then is necessary to initiate the setting action of the adhesive, and the catalyst will insure completion of the setting operation. It is preferred to use an appropriate extender for the reasons that the elasticity of the resulting board will be increased and stresses normally resulting from the ageing of the adhesive in the final product will be avoided. The extender or filler has the further advantage of effecting additional binding in the small cavities between the chips in the formed product. The following comprises a satisfactory binding agent for use with each 100 pounds of dried chips:

6 lbs. solid resin parts
4.5 lbs. extender flour
15 lbs. water
0.25 lb. catalyst Another binding agent mixture employing two specific types of adhesive which also is satisfactory for use with each 100 pounds of dried chips is as follows:

3 to 4 lbs. urea-formaldehyde resin
3 to 4 lbs. melamine resin
2 to 3 lbs. soya protein extender
7 to 10 lbs. water
0.45 to 0.6 lb. catalyst Any desired type of mixer may be employed to effect the required thorough mixing of the dried chips and the binding agent. The resulting mixture of chips and binding agent is substantially dry, preferably having a moisture content of from twelve to seventeen percent by weight. In fact, the resulting mixture looks to be completely dry, feels substantially dry, and only by pressing the chips together will any binding effect of the adhesive be apparent.

Consequently, when this final chip mixture is gravity fed into a suitable press, the individual chips will have the natural tendency of coming to rest in the press compression chamber with their maximum dimension, which in most cases is in the d'rection of their fibers, disposed substantially horizontally. The previously described desired orientation of the chips is thus effected initially as a natural result of gravity feeding the final chip mixture into the compress'on chamber. Completion of the desired orientation of the chips is effected by the plunger of the press compressing each batch of chips fed thereto against the next preceding and already compressed batch, or a board or other suitable obstacle placed in the compression chamber when a first run of the press is started. Whether either a horizontal or a vertical press is employed, substantially the same chip orientation results, the press plunger in each case acting in a direction longitudinally of the board being formed. It will be understood that the compression chamber is open at opposite ends, inlet and outlet, the plunger operating in the inlet end and being withdrawn therefrom in its return or inactive stroke to enable batch gravity feeding of the chip mixture, and the board thus formed being progressively moved in incremental steps beyond the outlet end of the chamber to effect the necessary thermosetting of the adhesive. The side walls of the compression chamber comprise heated plates spaced from each other in parallel relationship a distance equal to the desired thickness of the end product. The width of these plates obviously determines the width of the compression chamber and of the formed board. The final product thus comprises an extruded board, the density of which may be varied selectively by varying the resistance to its movement through the press. Such resistance is determined primarily by the friction between the board being formed and the surfaces of the heating plates.

The length of the heating plates defining the compression chamber of the press is such as to insure application of the desired relatively low temperature for a sufficient time to effect at least substantial initiation of the setting process of the adhesive and is determined also by the length and timing of the piston stroke so as to insure complete bonding together and integration of the successively formed strata comprising the final product. Since the piston pressure is applied to each batch of mixed chips in a direction longitudinally of the board being formed, the desired orientation of the chips will be assured.

As shown in Fig. 2 of the drawings, the longitudinal axis of the board is represented by the broken line 9, and most of the chips thus will be oriented in the board with their major axes disposed substantially at right angles to the longitudinal axis of the board. This orientation of the chips is illustrated diagrammatically at the right side of each of the figures at 11, wherein the several radiating arrows represent the angular range of the major axes of the chips. The double arrows 12 in each of the figures indicate the direction of the width of the boards, while the arrows 13 therein represent the direction of the thickness of the boards. The chips are predominantly disposed with their lengths extending substantially at right angles to the longitudinal axis 9 of the board, either parallel to the arrows 12 or 13 or any of those illustrated at 11 or disposed intermediate any of the latter and in the plane defined thereby. It will now be more clearly apparent why the maximum length of most of the chips is limited to the thickness of the board.

In order to form the passages or bores 7 in the board 4, it is necessary only to provide suitable tubes, or the like, extending longitudinally through the compression chamber of the forming press and the press piston which are stationary relative to the latter. As explained in my co-pending application hereinbefore identified, such tubes may be laterally apertured to provide for the escape of steam during the forming of the board, or may be additionally employed as heating means, if desired. It will also be appreciated that passages of different shape and arrangement than those illustrated may be provided in the board in similar manner. In fact, a board similar to that shown in Fig. 1 may be provided by employing half-round, longitudinally extending core members at one side only of the press compression chamber and subsequently joining two boards so formed along their sides having resulting longitudinal recesses which may thus be paired to define the passages 7. Finishing panels or materials, such as the wood veneer panels 5 and 6 illustrated in Fig. 3, may be applied to the board 4 or 8 in conventional manner at any time after the formed board has been discharged from the press and stored for a relatively short time to effect curing or insure completion of the glue setting process, thus increasing the longitudinal bending strength of the board and minimizing its longitudinal expansion and contraction in the direction of arrow 16.

As previously mentioned, a relatively low temperature is employed which, in the case of urea-formaldehyde resins being used, will be from 340 degrees to 375 degrees F. Obviously, the specific temperature required will depend primarily upon the make-up of the selected binding agent. The pressures employed likewise are relatively low, being only sufficient to effect the desired density of the end product and move each incrementally formed strata thereof and the previously formed portion of the board through the compression and heating chamber of the press in successive step-by-step movements. In actual practice it has been found that for boards ranging from about one-half to two inches in thickness and having a chip density to cause them to weigh in the neighborhood of thirty-eight pounds per cubic foot, depending upon the type of raw material employed, a press plunger pressure of the order of 350 to 430 pounds per square inch should be employed. The maximum pressure should never exceed the elastic limit of the particular wood chips being used, so that the end product retains normal wood characteristics and plasticizing of the wood fibers is easily avoided.

To insure smoother finished side surfaces for the board, a zoning of the chips, in addition to the previously described orientation thereof, may be accomplished to result in most of the finer material or smaller chips in the chip and binding agent mixture defining outside layers for the full width of and extending longitudinally on each side of the board and separated by a central longitudinally extending layer comprising most of the larger chips or coarser material in the mixture. Such outside layers are designated in Fig. 2 by reference numeral 14 and the thicker central or intermediate layer by reference numeral 15. As previously explained, this zoning may best be accomplished by gravity feeding the mixture to be compressed down inclined passageways at each side of a vertical press. As has also previously been described, the gravity feeding employed is always of an intermittent nature to deposit uniformly over the whole of the receiving area of the compression chamber a strata of chips to the desired depth. When such gravity feeding down opposed inclined passages at opposite sides of a vertical press is effected, equal amounts of the mixture are passed to each feeding plane or inclined passages. Since the mixture is substantially dry, as previously explained, during such feeding down the inclined passages, a large proportion of the finer material or smaller chips flows between or sifts downwardly through the coarser material or larger chips. Separation of the coarser and finer materials during such movement down the inclined passages is also effected by the natural tendency of the larger chips to bounce and move more rapidly down and of the smaller chips or finer material to move more slowly down and tend to adhere to the surface of the inclined planes, with the net result that the smaller particles or finer chips fall adjacent the outer walls of the compression chamber and the larger chips fall more predominantly toward the center of the chamber. The desired zoning of the chip mixture comprising the longitudinal layers 14 and 15, as well as the initial orientation of the chips, is thus obtained in each stratum before the application of compressive forces thereto by the press plunger. As previously described, the plunger or piston during its active phase of compressing each stratum and moving the same and the previously formed strata through the press, completes the desired orientation of the chips. It will be understood, of course, that both the desired orientation and zoning of the chips are effected in the same manner for both a solid board like that illustrated in Fig. 2 and a tubular board similar to that shown in Fig. 1.

From the above it is though that it will be readily apparent that board having the physical characteristics initially described herein may be continuously extruded and cut to desired lengths. As a specific example of the stability against warpage of the instant board, it has been found that following twenty-four hours' submersion under water, a solid board similar to that illustrated in Fig. 2 swells in thickness only about three percent, in width only from one to two percent, and in length from ten to fifteen percent. Under the same test conditions a similar board having wood veneer panels such as 5 and 6 adhered thereto swells in thickness only about one to two percent, in width only about one percent, and in length from two to three percent. The advantages of the present board in this respect will be clearly apparent when it is borne in mind that, by comparison with the swelling or warping of the present non-veneered board, a board of natural wood subjected to the same test conditions will swell from ten to thirty percent in the direction of its thickness, and a board made by the badge process will swell from fourteen to eighteen percent in the direction of its thickness.

It is thought that the invention and many of its attendant advantages will be understood from the foregoing description, and it will be apparent that various changes may be made in the form, construction and arrangement of the parts without departing from the spirit or scope of the invention or sacrificing all of its material advantages, the form hereinbefore described being merely a preferred embodiment thereof.

I claim:

1. A board comprising wood chips of various lengths in the direction of their fibers, with the maximum length of most of said chips being less than the thickness of the board, said chips being arranged in successive strata extending transversely for the full width and thickness of the board and bonded together by a thermo-setting binding agent, and said chips being predominantly disposed with their lengths extending substantially at right angles to the longitudinal axis of the board.

2. A board according to claim 1 wherein most of the smaller chips are disposed in longitudinally extending outside layers separated by a central layer comprising most of the larger chips.

3. A board comprising wood chips of various dimensions less than the thickness of the board and bonded together by a thermo-setting adhesive, the chips being so oriented in the board that the major axes of most of them are disposed substantially at right angles to the longitudinal axis of the board.

4. A board according to claim 3, wherein the differently sized chips are so zoned throughout the length of the board that the coarser ones are disposed predominantly in a central layer and most of the finer ones in outer layers separated by said central layer and defining the side surfaces of the board.

5. An extruded wood chip board comprising wood chips of various dimensions and mostly of lengths less than the thickness of the board and adhered together by a thermo-setting adhesive, with the major axes of most of said chips disposed substantially at right angles to the longitudinal axis of the board.

6. An extruded board according to claim 5, wherein said chips are zoned with most of the smaller ones defining outer side layers separated by a central layer comprising most of the larger chips.

7. An extruded board comprising wood chips and a thermosetting adhesive bonding said chips together, most of said chips being disposed therein with the fibers of each chip extending substantially at right angles to the longitudinal axis of the board.

8. An extruded wood chip board made up of a substantially dry mixture of coarse particles, comprising wood chips of various lengths in the direction of their fibers and mostly less than the thickness of the board, finer particles of wood materials, and from one to twelve percent by weight of the board of a thermo-setting adhesive, all bonded together in successively integrated strata with most of said chips disposed lengthwise substantially transversely of the length of the board.

9. An extruded wood chip board according to claim 8, wherein the moisture content of the mixture employed to make the board is from twelve to seventeen percent by weight.

10. A board comprising wood chips of various lengths in the direction of their fibers, with the maximum length of most of said chips being less than the thickness of the board, said chips being arranged in successive strata extending transversely of the board and bonded together by a thermo-setting binding agent, said chips being predominantly disposed with their lengths extending substantially transversely of the board, and said board having bores spaced from each other and extending longitudinally therethrough.

11. A board comprising a core of wood chips of various lengths in the direction of their fibers, with the maximum length of most of said chips being less than the thickness of the board, said chips being arranged in successive strata extending transversely of the board and bonded together by a thermo-setting binding agent, said chips being predominantly disposed with their lengths extending substantially transversely of the board, said board having bores spaced from each other and extending longitudinally therethrough, and finish panels adhered to the side surfaces of said core.

12. A board comprising wood chips of various lengths in the direction of their fibers, with the maximum length of most of said chips being less than the thickness of the board, said chips being arranged in successive strata extending transversely of the board and bonded together by a thermo-setting binding agent, said chips being predominantly disposed with their lengths extending substantially transversely of the board, most of the smaller chips being disposed in longitudinally extending outside layers separated by a central layer comprising most of the larger chips, and finished panels adhered to the outer surfaces of said outside layers and perpendicular to said strata.

13. A composite board, comprising an extruded core of wood chips of various dimensions and mostly of lengths less than the thickness of the core and adhered together by a thermo-setting adhesive, with the major axes of most of said chips disposed at substantially right angles to the longitudinal axis of the core, and finish panels secured to opposite outer surfaces of said core.

14. A composite board according to claim 13 having a plurality of spaced bores extending through said core longitudinally thereof.

References Cited in the file of this patent

UNITED STATES PATENTS

| | | |
|---|---|---|
| 1,125,445 | Beadle | Jan. 19, 1915 |
| 1,500,207 | Shaw | July 8, 1924 |
| 2,260,081 | LeFebure | Oct. 21, 1941 |
| 2,280,022 | Banigan et al. | Apr. 14, 1942 |
| 2,305,817 | Sukohl | Dec. 22, 1942 |
| 2,369,006 | Banks | Feb. 6, 1945 |
| 2,519,036 | Ford et al. | Aug. 15, 1950 |
| 2,642,371 | Fahrni | June 16, 1953 |
| 2,649,034 | Gramelspacher | Aug. 18, 1953 |
| 2,655,189 | Clark | Oct. 13, 1953 |
| 2,717,420 | Roy | Sept. 13, 1955 |